United States Patent Office 3,312,341
Patented Apr. 4, 1967

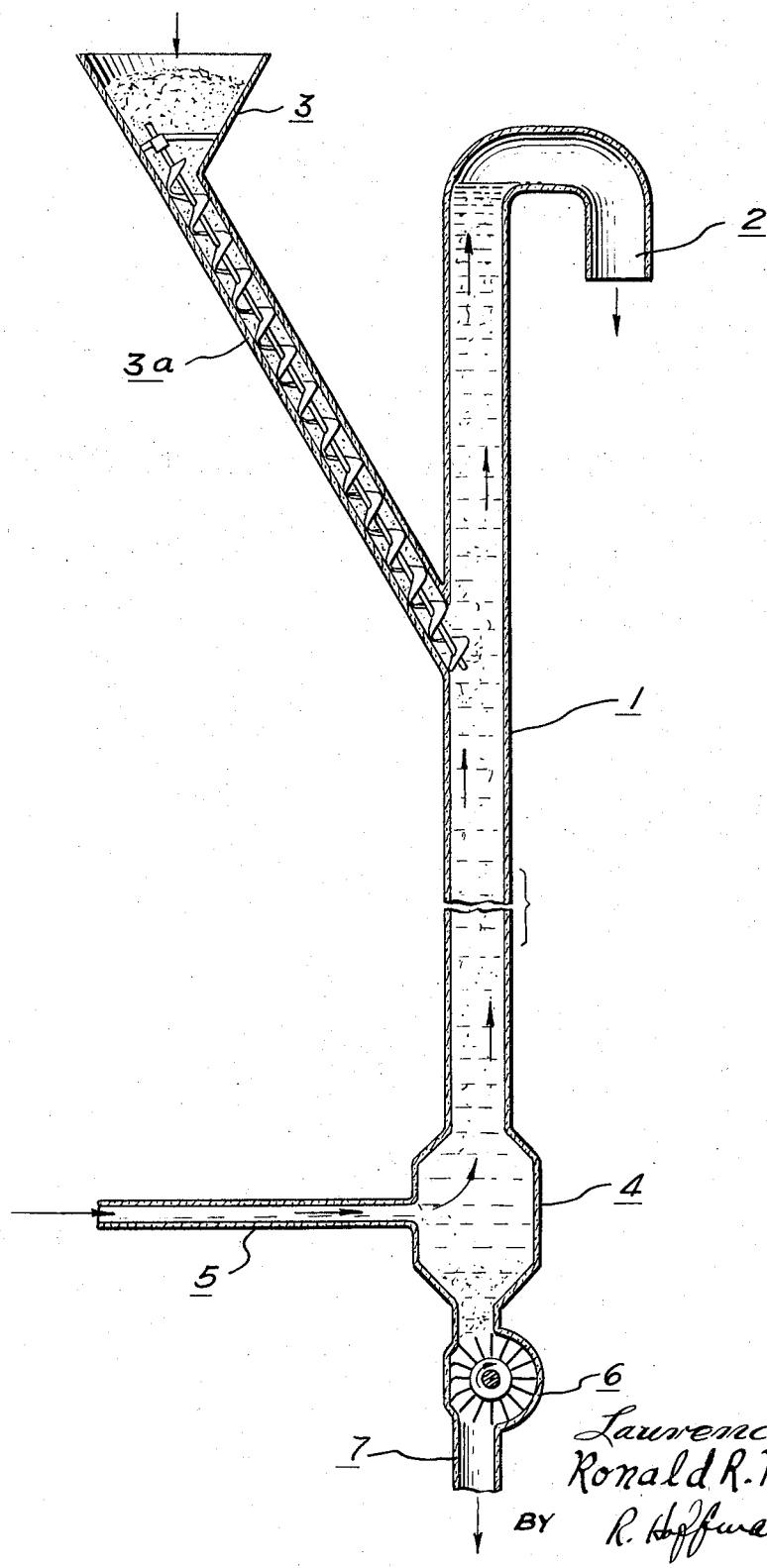

3,312,341
FLOTATION SEPARATION OF DRY MILLED CEREAL GRAIN COMPONENTS
Laurence A. Weinecke, Peoria, and Ronald R. Montgomery, Tremont, Ill., assignors to the United States of America as represented by the Secretary of Agriculture
Filed Aug. 2, 1965, Ser. No. 476,760
2 Claims. (Cl. 209—2)

A nonexclusive, irrevocable, royalty-free license in the invention herein described, throughout the world for all purposes of the United States Government with the power to grant sublicenses for such purposes, is hereby granted to the Government of the United States of America.

This invention relates to a flotation process and center-feed apparatus for the separation of the aspirated effluent from a corn or sorghum dry milling operation into separate streams of highest quality brewer's grits and of germ, whereby the prior art flaking roll operation that seriously lowers the yields of minimum oil content large grits (endosperm) is avoided.

The berries or kernels of cereal grains, e.g., corn or sorghum, comprise hull (bran), endosperm, and germ portions, each of which has well known markets. The dry millers would welcome any practicable advances toward a total separation of germ and endosperm since such would provide not only a larger yield of the premium oil but also would provide a larger proportion of practically oil-free grits that are required by the brewing and core binder industries. In addition, the breakfast cereal industry, which pays a premium for the large grits that are processed into flakes, demands very low oil contents to minimize the possibilities of storage rancidity.

Conventional dry milling processes first employ either a Beall degerminator or corrugated cracking rolls to free the hull and to provide a too frequently incomplete separation of germ and endosperm. After screening to remove most of the tiny debris particles and then aspirating the hulls, the remaining material is passed through smooth rolls which not only free most of the attached germ residues from the endosperms and flatten the germs into expanded discs that can be screened but that also unavoidably cause considerable flaking and reduction in size of the rather brittle endosperms, thereby markedly decreasing the yields of large grits.

A principal object of the present invention is a water flotation process whereby only the oil bearing germs and isolated germinal fragments present as components of a random mixture of dry milled corn germs, endosperms free of attached germ substance, endosperms with attached germinal tissue, and some unaspirated hull fragments float upward through the upper half of a cylindrically confined column of water flowing upwardly at a critical velocity from a bottom water inlet while the only slightly less buoyant other components, i.e., the endosperms, and endosperms having some residual germ tissue, surprisingly descend through the lower half of the ascending column of water, said process also encompassing as a most useful refinement one or more recycles of the endosperms under critically modified water velocity conditions whereby it is possible to successively obtain endosperm fractions containing less and less attached germ tissue, i.e., having a lower average oil content.

Another object is a flotation process whereby improved yields of No. 4 mesh prime grits are obtained, said grits being practically completely free of contamination with tiny oil-containing particles of germ that defy conventional screening operations.

Still another object is a flotation process that not only removes practically all of the adventitious oil bearing particles accompanying the grits but also collects the particles so that the profitable oil they contain can be recovered.

The above objects and related advantages will be more clearly understood by reference to the following specification and drawings.

In accordance with the objects of our invention we have now surprisingly discovered that despite the existence of only very minor differences in the respective densities of the isolated germ, endosperm, and hull tissues, and even smaller net differences where a fragment of one kind remains attached to another tissue, the use of selected critical water velocities in our novel vertical flotation chamber, both to be hereinafter more fully described, provide an exquisitely selective fractionation not only of discrete cereal grain germs and of the endosperms but also of endosperms having various extents of attached germs or hull so that the perfectly discrete tissues need not be subjected to a detrimental smooth rolling operation, and the unavoidable small fragments of oil-bearing germ and hull tissue are salvaged rather than lost.

With reference to the drawing the figure represents a vertical section of our novel center-feed flotation apparatus in which 1 is a vertical, extended flotation tube advantageous having a height of not less than about 6 feet and an internal diameter of at least about 2 inches when it is intended to separate about 150–200 pounds of milled cereal grain per hour, and being of a transparent material, e.g., Plexiglas, Lucite, or glass, that is integral with U-shaped discharge elbow 2 for the discharge of the germs or, on recycle, the higher oil content endosperm fraction. Feed funnel 3, situated higher than elbow 2 to avoid the presence of water, is integral with sloped feed tube 3a terminating integrally in flotation tube 1 at its midpoint and containing a positive feed means such as an auger (not shown). The flotation tube is downwardly continuous with bulbous enlargement 4 which serves to stratify the vertically ascending stream lines and also receives water inlet pipe 5 that is capable of delivering sufficient water to give the ascending stream of water a velocity of 2 inches per second. Just below the said bulbous enlargement is rotary lock 6 driven by an external means, not shown, which restrains the loss of water while permitting the continuous removal of the endosperms or low oil content fraction through open delivery segment 7.

*Example 1*

100 pounds of corn components resulting from passage through a Beall degerminator set for a preponderance of $-4 +6$ grits and then aspirated to substantially remove the water-imbibing hulls (bran) was introduced into the flotation tube or chamber (2-inch diameter) at the rate of 150 pounds per hour. The upward velocity of the water in the flotation tube was 5.5 feet per minute (1.1 inches per second) corresponding to a volume of 0.9 gallon per minute. From the discharge elbow (top) were obtained 27 pounds of germs assaying 34.8 percent of oil, which germs were noticeably whiter (essentially free of endosperm particles and attached endosperm) as compared with germs obtained by conventional screening. While the aforesaid germs were being recovered at the upper end of the flotation apparatus, the lower delivery segment provided 73 pounds of endosperm material having an average oil content of 0.48 percent. The 73 pounds of endosperm material was then recycled to the flotation apparatus wherein the water velocity had been increased to 7.3 feet per minute (1.45 inches per second) which at the top gave 12 pounds of grits assaying 0.75 percent oil. The 61 pounds of endosperm material collected at the bottom of the column was then refractionated at a water velocity of 9.2 feet per minute into a 19 pound upper fraction having an average oil content of 0.55 percent and 42 pounds of a bottom fraction having an oil content of 0.38 percent. By comparison, it is known that commercially available prime grits obtained by conventional screening processes contain 0.5–1.0 percent of oil.

*Example 2*

100 pounds of aspirated sorghum from a degerminator −8 +12 mesh mill stream was subjected to flotation fractionation in the same apparatus and under the same conditions used in Example 1 excepting that the water velocity was only 3.8 feet per minute whereby there were obtained from the upper outlet (overhead) 2 pounds of germs analyzing 20.7 percent of oil and from the bottom outlet 98 pounds of grits having an average oil content of 0.17 percent. Recycling of the obtained endosperm grits at a water velocity of 4.0 feet per minute yielded as the overhead fraction 11 pounds of grits having an average oil content of 0.33 percent and from the bottom outlet 87 pounds of grits having an average oil content of .16 percent, i.e., having smaller extents of attached germ substance. Further recycling of the bottom fraction at a water velocity of 4.3 feet per minute water gave 20 pounds of overhead grits analyzing 0.17 percent oil and 67 pounds of grits from the lower outlet, said lower outlet grits having an average oil content of only 0.15 percent.

We claim:

1. A flotation process for fractionating a substantially bran-free dry-milled mixture of corn germs and corn endosperms having a combined average oil content of about 9.75 percent into a germ fraction essentially free of endosperm which fraction is characterized by an oil content of about 34.8 percent and a plurality of endosperm fraction having respective average oil contents of 0.75 percent, 0.55 percent, and 0.38 percent, said process comprising;
    (a) introducing the milled corn mixture into the mid-height of a vertically-disposed tubular flotation apparatus that is fully occupied by a column of water that is flowing upwardly from a bottom inlet at a constant velocity of 5.5 ft. per minute;
    (b) separately collecting the said germ fraction from the upper discharge end of the apparatus and from the lower end thereof a crude endosperm fraction having an average oil content of 0.48 percent;
    (c) increasing the velocity of the water column to 7.3 ft. per minute;
    (d) reintroducing the thusly obtained crude endosperm fraction into the flotation apparatus;
    (e) separately collecting from the upper end an endosperm fraction (prime grits) having an oil content of 0.75 percent and from the lower end an endosperm fraction having an average oil content of 0.43 percent;
    (f) increasing the velocity of the water column to 9.2 ft. per minute;
    (g) reintroducing the endosperm fraction last obtained from the lower outlet of the apparatus to provide at the upper outlet a minor endosperm fraction having an oil content of 0.55 percent and at the lower outlet a major endosperm fraction having an oil content of 0.38 percent.

2. A flotation process for fractionating a substantially bran-free mixture of dry milled grain sorghum germs and endosperms, said mixture having an average oil content of 0.21 percent, said process comprising;
    (a) introducing the said mixture into the mid-height of a vertically-disposed tubular flotation apparatus that is fully occupied by a column of water that is flowing upwardly from a bottom inlet at a constant velocity of 3.8 ft. per minute;
    (b) separately collecting from the upper outlet of the apparatus a germ fraction having an oil content of 20.7 percent and from the lower outlet a first endosperm (grit) fraction having an average oil content of 0.17 percent;
    (c) increasing the velocity of the water column to a value of 4.0 ft. per minute;
    (d) reintroducing the thusly obtained endosperm fraction into the flotation apparatus;
    (e) separately collecting from the upper discharge end thereof a minor overhead fraction having an average oil content of 0.33 percent and from the lower outlet a major fraction having an average oil content of 0.16 percent;
    (f) increasing the velocity of the water column to a value of 4.3 ft. per minute;
    (g) reintroducing the fraction last obtained from the bottom outlet;
    (h) separately collecting as the overhead fraction a minor proportion of grits having an oil content of 0.17 percent and as the bottoms fraction a major proportion of grits having an average oil content of 0.15 percent.

References Cited by the Examiner

UNITED STATES PATENTS

| 286,791 | 10/1883 | Dean | 209—159 |
| 636,675 | 11/1899 | Latimer | 209—158 |
| 2,426,839 | 9/1947 | Morris | 209—158 X |

FOREIGN PATENTS

| 3,192 | 1878 | Great Britain. |
| 210,663 | 2/1924 | Great Britain. |
| 236,947 | 12/1925 | Great Britain. |

FRANK W. LUTTER, *Primary Examiner.*